June 9, 1925.
F. A. LEIGH
SHEAR AND KNIFE SHARPENER
Filed Dec. 22, 1923
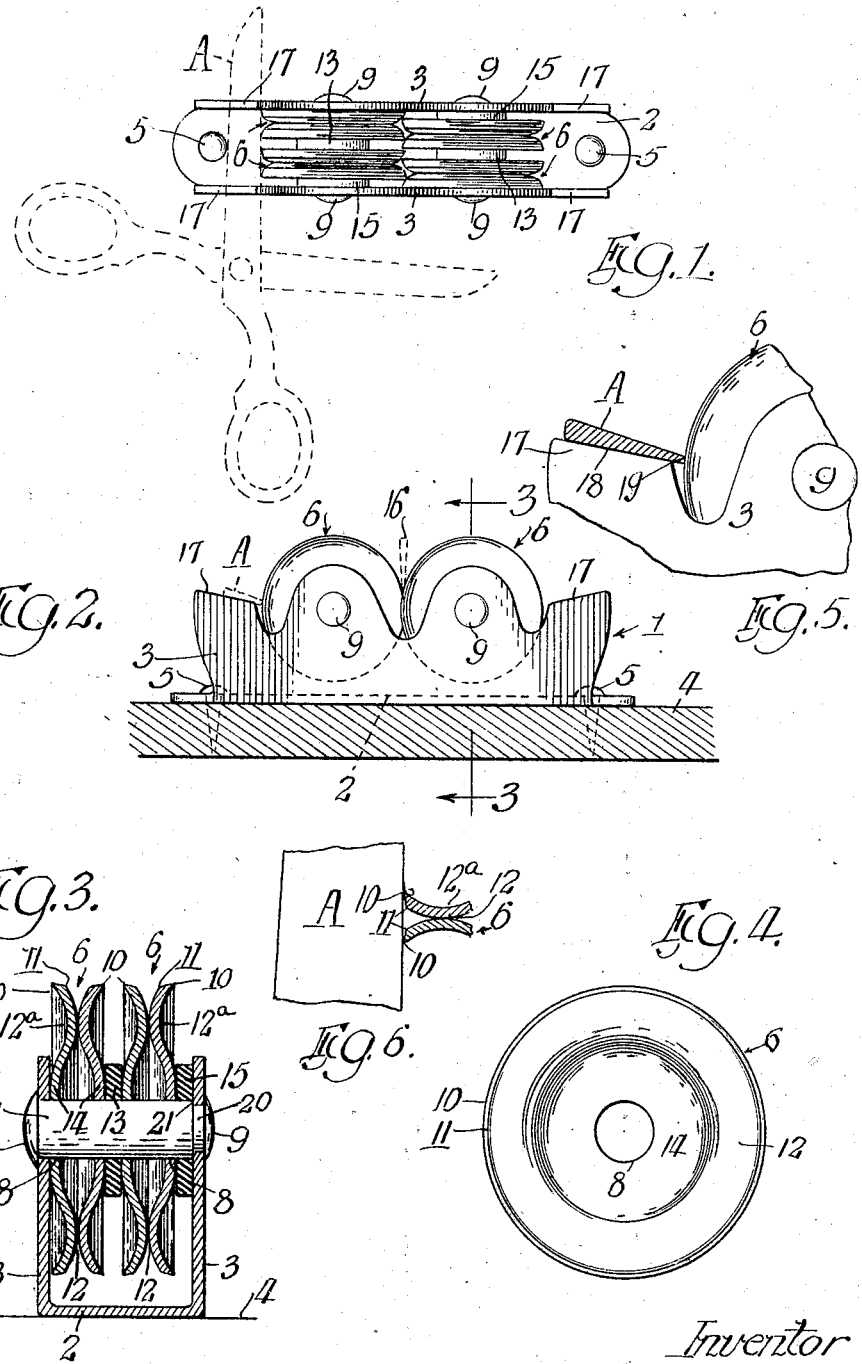

Patented June 9, 1925.

1,541,059

UNITED STATES PATENT OFFICE.

FRED A. LEIGH, OF CHICAGO, ILLINOIS.

SHEAR AND KNIFE SHARPENER.

Application filed December 22, 1923. Serial No. 682,140.

*To all whom it may concern:*

Be it known that I, FRED A. LEIGH, a citizen of the United States, residing at Chicago, in the county of Cook and State of Illinois, have invented new and useful Improvements in Shear and Knife Sharpeners, of which the following is a specification.

This invention relates to sharpeners of the type employing closely spaced, disc shaped metal cutters, over the aligned cutting edges of which blades of knives, scissors, shears, and like cutting implements may be drawn for sharpening them.

One object of my invention is to provide in the body of each cutter around its cutting edge a cavity or recess merging into the cutting edge so that metal particles or shavings cut from the blade being sharpened on being drawn across the cutter may readily clear the cutting edge of the cutter by entering the cavity, and thus avoid curling up or burring at the cutting edge to interfere with proper sharpening of the blade and producing a ragged or irregular edge as heretofore.

A further object of my invention is to provide this cavity or recess in each cutter by subjecting the cutter disc, in the making thereof, to a punch press operation to bulge out from one side of the disc the portion forming the cavity.

Another object of my invention is to provide the base of the device with one or more platforms at the sides of the cutters and arranged transverse thereto, so that the blades being sharpened may be laid flatwise on the platforms and be drawn across the cutting edges of the cutters in the sharpening operation.

A further object of my invention is to provide these platforms on opposite sides of the cutter discs, and to so arrange the latter that blades may be sharpened from either end of the device and from either side thereof, thus making the sharpener universal, in that it is not necessary to always sharpen the blades from one end or from one particular side of the device.

Other and further objects of my invention will appear from the following specification, taken in connection with the accompanying drawings, in which—

Fig. 1 is a top plan view of a sharpener constructed in accordance with my invention;

Fig. 2 is a side view of the sharpener;

Fig. 3 is a vertical sectional view taken on line 3—3 of Fig. 2;

Fig. 4 is a front view of one of the cutter discs;

Fig. 5 is a vertical sectional view through one cutting disc and engaged blade; and Fig. 6 is a plan view of the parts shown in Fig. 5.

As shown in the drawings, the sharpener of my invention comprises a base 1 preferably made channel shape in form and having a flat bottom wall 2 and upright side walls 3, 3. Said side walls 3, 3 extend above the bottom wall 2 substantially the same distance, have the same shape or contour, and, being integral with the bottom wall 2, as shown in Fig. 3, allow the base to be blanked from a single piece of sheet metal. The base 1 may be held in upright workable position on the work-bench, table, shelf or other underlying support 4 by nails or screws 5, 5 driven into the support 4 through holes in the bottom wall 2.

Located between the side walls 3, 3 are two sets of disc shaped cutters 6, 6 with a plurality of cutters in each set, and the sets arranged one in advance of the other, as shown in Figs. 1 and 2. As illustrated in Fig. 1, each set comprises four cutters 6, 6. In the device shown in the drawings, the cutters 6, 6 are in the form of circular discs, mounted on shafts 7, 7 extending through openings 8 in the center of the discs and also through the side walls 3, 3, as shown, with the ends of the shafts upset or riveted, as at 9, 9, to hold them in place. There is a shaft 7 for each set of cutter discs 6, and all the discs, in the device shown, have the same diameter, although this is not necessary if their cutting edges are aligned.

Each disc 6 has two peripheral edges 10, 11 spaced apart by the thickness of the body of the disc. The disc is first produced in flat form with its peripheral edges 10, 11 in the plane of each other. The disc in this form, by punch press operation or otherwise, has its body part 12 immediately surrounding the edge 10 bulged or forced out of the normal plane of the disc to the side of the disc containing the other edge 11. In this operation, the edge 11 is brought or drawn inward of the plane of the edge 10, thereby making that edge the outermost peripheral edge of the disc and the cutting edge of the disc. So formed, the edge 11 does not contact with the cutting edge of a shear blade A when placed against the cutting edge 10 and therefore does not interfere with the function of the edge 10 properly sharpening the cutting edge of the shear blade when the latter is drawn transversely across the edge 10.

The cutters discs 6, 6 of each set are assembled on their shafts 7 with their cutting edges 10 reversely arranged, as by having one disc 6 placed with its cutting edge 10 facing one side wall 3 and the like edge of the next disc facing the opposite wall 3 throughout the set, thus enabling shear blades being sharpened from either side of the base 1. The two discs 6 in each set with their cutting edges 10 reversed are placed against each other with their bulged parts 12, 12 in contact. A spacer 13 on the shaft 7 between the innermost discs 6 spaces them apart so that their opposed cutting edges 10, 10 do not contact, as shown in Fig. 3. A disc 6 at one end of each set has its flat central portion 14 in contact with the adjacent side wall 3 of the base. The cutting edge 10 of this disc is slightly to the rear of the plane of the center portion 14 and thus does not bear against the side wall 3. The disc 6 at the opposite end of the set is spaced from the adjacent side wall 3 by a spacer 15 on the shaft 7, as shown in Fig. 3. As indicated in Fig. 1, the cutter discs 6 in the two sets are arranged with the spacer 15 in one set against side wall 3 and the corresponding spacer in the other set against the other side wall. This brings the cutting edges 10 of one set in the spaces between the cutting edges 10 of the other set, thus allowing the cutting edges of the two to come closely adjacent each other and overlap or extend past each other so that the cutting edge of a knife blade 16 (Fig. 2) may be sharpened by the device.

At the ends of the base 1 are tables or platforms 17, 17 arranged slightly above the center of the cutter discs 6 and transverse thereto, as shown in Fig. 2. These platforms 17, 17 are carried by the side walls 3, 3 and in the form of device shown are formed by the upper edges of said side walls outside of the cutters 6, 6. The shear blade A is laid on one of the platforms 17 with its cutting edge against the cutting edges 10, 10 of the adjacent set of discs 6, 6, and by being drawn across these edges 10 is sharpened. With two platforms 17, 17, shear blades may be sharpened from either end of the device.

The platforms 17, 17 are arranged at such angles to the discs 6 that when the shear blades A are laid or rested on the platforms with their inner faces 18 against the same their beveled edges 19 along their cutting edges bear flatwise against the cutting edges 10, 10, as shown in Fig. 5. The cavities or recesses 12$^a$, formed by the bulged portions 12, receive the cuttings or shavings cut from the blades by the cutting edges 10, and thus avoid curling or burring of these pieces to interfere with the proper cutting function of the edges 10.

The sharpener of my invention is simple in construction and efficient in operation. By having cutters 6, 6 in circular disc form, and loose on the shaft 7, the cutters can be turned to bring the entire length of each cutting edge 10 into use. In order that the cutter discs 6 may not be squeezed between the walls 3, 3 and be held from turning, each shaft 7 has one end reduced, as at 20, to form a shoulder 21 against the inside of the adjacent wall 3.

While I have shown and described in detail herein a sharpener of my invention, it is of course to be understood that the details of construction and arrangement of parts may be variously changed and modified without departing from the spirit and scope of my invention.

I claim as my invention:

1. In a sharpener of the character described, the combination of a base, a plurality of disc like cutters carried by the base and having their peripheral edges aligned, said cutters each having a portion of its body between its center and one peripheral edge bulged out of the normal plane of the disc to bring one of the peripheral edges of the disc inward of the other so that the outermost peripheral edge may form the cutting edge of the disc.

2. In a sharpener of the character described, the combination with a base, of a plurality of disc like cutters carried by the base and arranged side by side with their cutting edges aligned, and an inclined platform carried by the base and projecting outward from the cutters at the horizontal diameter thereof for supporting shear or scissor blades while being sharpened by the cutters.

3. In a sharpener of the character described, the combination with a base, of a plurality of disc like cutters carried by the base and arranged side by side with their cutting edges aligned, and inclined platforms carried by the base on opposite sides of the cutters and projecting outward therefrom at the horizontal diameter of the cutters for supporting scissor or shear blades while being sharpened at either end of the device.

4. In a sharpener of the character described, the combination of a base, a plurality of disc like cutters carried thereby and arranged side by side, said cutters having aligned cutting edges, and platforms on said base to support shear or scissor blades being sharpened when drawn across the cutting edges of the cutters, said platforms arranged transverse to the cutters on opposite sides of the same so that the blades may be sharpened from either side of the discs, certain of said cutters being arranged with cutting edges reverse to the other cutters so that the blades may be sharpened from either side of the device.

5. In a sharpened of the character described, the combination with a base, having upright side walls, of a plurality of disc-like cutters between said side walls and supported thereby, said cutters being arranged side by side and having their cutting edges aligned, the upper edges of said side walls on opposite sides of the cutters being inclined and projecting outward from the cutters at the horizontal diameter of the cutters to form platforms for supporting shear or scissor blades while being sharpened by the cutters.

6. In a sharpener of the character described, the combination with a base having upright side walls, of two sets of cutting discs between and supported by said side walls, with one set in advance of the other, each set consisting of a plurality of discs arranged side by side with the cutting edges of the discs of one set projecting into the spaces between the cutting edges of the discs of the other set, the upper edges of said side walls on opposite sides of the two sets of discs being inclined and projecting outward from the discs at the horizontal diameter of the discs to form platforms so that shear or scissor blades may be sharpened from either end of the device.

7. In a sharpener of the character described, the combination of a base having upright side walls, a shaft extending between and supported by said side walls, a plurality of circular discs loose on said shaft, said discs being arranged side by side with their cutting edges aligned, said cutting edges being formed by bulging from one side the discs about said edges, certain of the discs being arranged with their bulged portions in contact to reverse their cutting edges and space them apart, and a platform formed by the upper edges of the side walls at one side of the discs to support a shear or scissor blade when drawn across the discs in sharpening the same.

In testimony that I claim the foregoing as my invention, I affix my signature, this 17th day of December, 1923.

FRED A. LEIGH.